(12) United States Patent
Ganapathiappan

(10) Patent No.: US 7,737,196 B2
(45) Date of Patent: Jun. 15, 2010

(54) COMPOSITIONS AND METHODS FOR PRODUCING URETHANE COATED PIGMENT PARTICLES

(75) Inventor: Sivapackia Ganapathiappan, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 113 days.

(21) Appl. No.: 11/789,172

(22) Filed: Apr. 23, 2007

(65) Prior Publication Data

US 2008/0257212 A1    Oct. 23, 2008

(51) Int. Cl.
C09D 11/00 (2006.01)
C08L 33/06 (2006.01)
C08F 6/00 (2006.01)
C08F 297/02 (2006.01)
C08G 18/28 (2006.01)

(52) U.S. Cl. ............. 523/160; 523/161; 524/560; 524/566; 524/577; 524/590

(58) Field of Classification Search ........... 523/160, 523/161, 200, 201, 205; 524/566, 560, 577, 524/590
See application file for complete search history.

(56) References Cited

U.S. PATENT DOCUMENTS

| | | | |
|---|---|---|---|
| 5,554,739 A | 9/1996 | Belmont | |
| 5,889,083 A * | 3/1999 | Zhu | 523/161 |
| 5,922,118 A | 7/1999 | Johnson et al. | |
| 5,990,202 A | 11/1999 | Nguyen et al. | |
| 5,990,230 A * | 11/1999 | Muramatsu et al. | 524/590 |
| 6,057,384 A | 5/2000 | Nguyen et al. | |
| 6,248,805 B1 | 6/2001 | Nguyen et al. | |
| 6,417,249 B1 | 7/2002 | Nguyen et al. | |
| 6,716,949 B2 | 4/2004 | Ganapathiappan | |
| 6,767,090 B2 | 7/2004 | Yatake et al. | |
| 6,841,591 B2 | 1/2005 | Vincent et al. | |
| 6,858,301 B2 | 2/2005 | Ganapathiappan | |
| 6,997,978 B2 | 2/2006 | Kabalnov et al. | |
| 7,030,175 B2 | 4/2006 | Vincent et al. | |
| 2003/0029355 A1 | 2/2003 | Miyabayashi | |
| 2003/0050362 A1 | 3/2003 | Sakai et al. | |
| 2003/0070580 A1 * | 4/2003 | Blease et al. | 106/31.27 |
| 2003/0195274 A1 | 10/2003 | Nakamura et al. | |
| 2003/0225185 A1 | 12/2003 | Akers, Jr. et al. | |
| 2004/0063808 A1 | 4/2004 | Ma et al. | |
| 2004/0127639 A1 | 7/2004 | Wang et al. | |
| 2004/0157956 A1 * | 8/2004 | Vincent et al. | 523/160 |
| 2004/0157957 A1 | 8/2004 | Ganapathiappan et al. | |
| 2005/0228069 A1 * | 10/2005 | Kataoka et al. | 523/160 |
| 2006/0178447 A1 * | 8/2006 | Burns et al. | 523/160 |

* cited by examiner

*Primary Examiner*—Vasu Jagannathan
*Assistant Examiner*—Alexander C Kollias

(57) ABSTRACT

The present invention is drawn to passivated pigment suspensions, methods of forming passivated pigment suspensions, and ink sets based thereupon. The coated pigment suspension can comprise a liquid vehicle and a passivated pigment suspended in the liquid vehicle. The coated pigment can include a pigment core, on which is deposited a passivation layer comprising a polymer precursor synthesized while separate from the pigment. A polymer encapsulation layer may be attached to or deposited on the passivation layer.

16 Claims, No Drawings

COMPOSITIONS AND METHODS FOR PRODUCING URETHANE COATED PIGMENT PARTICLES

BACKGROUND OF THE INVENTION

Computer printer technology has evolved to a point where very high-resolution images can be transferred to various types of media, including paper. Ink-jet printing involves the placement of small drops of a fluid ink onto a media surface in response to a digital signal. Typically, the fluid ink is placed or jetted onto the surface without physical contact between the printing device and the surface. Within this general technique, the specific method that the ink-jet ink is deposited onto the printing surface varies from system to system, and can include continuous ink deposit and drop-on-demand ink deposit. Regarding drop-on-demand printing systems, the ink-jet inks are typically based upon water and solvents such as glycols. Essentially, with these systems, ink droplets are propelled from a nozzle by heat or by a pressure wave such that all of the ink droplets ejected are used to form the printed image.

There are several reasons that ink-jet printing has become a popular way of recording images on various media surfaces, particularly paper. Some of these reasons include low printer noise, capability of high-speed recording, and multi-color recording. Additionally, these advantages can be obtained at a relatively low price to consumers. With respect to ink-jet ink chemistry, the majority of commercial ink-jet inks are water-based. Thus, their constituents are generally water-soluble, as in the case with many dyes, or water dispersible, as in the case with pigments. Furthermore, ink-jet inks have low viscosity to accommodate high frequency jetting and firing chamber refill processes common to ink-jet architecture.

Traditionally, dyes have been used as colorants in thermal ink-jet inks due to their vibrant colors, low cost, and compatibility with thermal ink-jet pens. However, images produced by dye-based inks tend to lack durability, i.e., they exhibit low water fastness, smear fastness, and light fastness. Replacing dyes with pigments as colorants can improve some of these properties, but the presence of pigments can result in images that have a surface that can suffer from lessened smear fastness. Polymers may be used in ink-jet inks to improve image durability. When present as additives, polymers can contribute to increased viscosity due to the increased number of particles suspended in the ink. Conversely, pigments may be encapsulated in polymers, thereby providing the desired durability benefits with fewer particles per unit volume. However, many pigment particles present functional groups that inhibit polymerization, resulting in incomplete encapsulation and the presence of appreciable amounts of residual monomers in the resulting suspension. Therefore, ink-jet applications would benefit from pigment-based ink-jet inks that feature pigments with improved encapsulation.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a dye" includes reference to one or more of such materials.

As used herein, "liquid vehicle" or "liquid medium" refers to the fluid in which polymer-encapsulated pigments of the present invention are dispersed to form a pigment suspension. Often, the fluid of the pigment suspension can be used as an ink-jet ink, or becomes incorporated with other solvents, surfactants, etc., to form an ink-jet ink. Many liquid vehicles and vehicle components are known in the art. Typical liquid vehicles can include a mixture of a variety of different agents, such as surfactants, co-solvents, buffers, biocides, sequestering agents, viscosity modifiers, and water. Additionally, the terms "aqueous liquid vehicle" or "aqueous vehicle" refer to liquid vehicles that contain water as a solvent. Such vehicles may also contain additional co-solvents as is known in the art.

As used herein, "pigment" generally includes pigment colorants, magnetic particles, aluminas, silicas, and/or other ceramics or organo-metallics, whether or not such particulates impart color. Thus, though the present description primarily exemplifies the encapsulation of pigment colorants, the term "pigment" can be used more generally to describe not only pigment colorants, but other pigments such as organometallics, ferrites, ceramics, etc. Sometimes, to provide information about the spatial relationship between the pigment and the encapsulating layers, the term "pigment core" is used, which refers to the component that is being encapsulated, and which is at the base of a layered polymer-encapsulated pigment.

As used herein, "precursor" or "polymer precursor" refers to the product of polymerization of two or more monomers, substantially all of said polymerization occurring outside a pigment dispersion and in the absence of any pigment particles. Once formed, such a precursor can be used as a passivation component to be added to a pigment dispersion to form a passivation layer on the pigment particles.

As used herein, "passivation layer" or "bridging layer" refers to a passivation component after it has been deposited or adsorbed onto the surface of a pigment particle. Preferably such a layer should substantially cover the surface of the particle and be distributed over said surface uniformly. In accordance with the present invention, the passivation component may be a polymer, e.g. a polyurethane, that is adsorbed onto the particle surface.

As used herein, "polymer-encapsulation layer" refers to a layer of polymer or latex material that is deposited on or attached to a passivation layer, e.g., by adsorption or covalent attachment, which is deposited on the surface of the pigment.

As used herein, a plurality of components may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.01 to 2.0" should be interpreted to include not only the explicitly recited values of about 0.01 to about 2.0, but also include individual values and sub-ranges within the indicated range. Thus, included in this numerical range are individual values such as 0.5, 0.7, and 1.5, and sub-ranges such as from 0.5 to 1.7, 0.7 to 1.5, and from 1.0 to 1.5, etc. This same principle applies to ranges reciting only one numerical value. Furthermore, such an interpretation should apply regardless of the breadth of the range or the characteristics being described.

It has been recognized that it would be advantageous to develop uniformly coated pigments suitable for use in ink-jet applications or for further encapsulation with additional polymers. In accordance with this, the present invention is drawn to compositions and methods having a coated pigment comprising a pigment core with a polyurethane passivation layer uniformly adsorbed on the pigment core. It is noted that when discussing a coated pigment composition or a method of formulating such a pigment, each of these discussions can be considered applicable to each of these embodiments, whether or not they are explicitly discussed in the context of that embodiment. Thus, for example, in discussing the polyurethanes present in a coated or polymer-encapsulated pigment, those polyurethanes can also be used in a method for making such pigments, and vice versa.

A method of making a passivated pigment can comprise the steps of a) dispersing pigment particles in an aqueous liquid vehicle to form a dispersion; b) introducing a first monomer and a second monomer into a water-miscible solvent outside of said dispersion to form a passivation coating solution in which the first monomer and the second monomer polymerize to form a polymer precursor without pigment particles being present; and c) forming a passivation layer on the pigment particles by adding the passivation coating solution to the dispersion so that the polymer precursor substantially and uniformly coats the pigment particles, thereby creating a passivated pigment dispersion. This passivated pigment may then be encapsulated further by polymerizing at least one monomer in the dispersion and depositing the resulting polymer onto the passivation layer.

In another embodiment, a pigment suspension may comprise dispersing pigment particles in an aqueous liquid vehicle to form a pigment dispersion. An additional step includes introducing a first monomer and a second monomer into a water-miscible solvent in which the first monomer and the second monomer polymerize to form a passivation coating solution containing a polymer precursor including at least one urethane linkage or urea linkage. With this step, the polymerization can be initiated separately from the pigment dispersion. Additionally, a step of forming a passivation layer on the surface of the pigment particles by adding the passivation coating solution to the pigment dispersion so that the polymer precursor substantially uniformly coats the pigment particles, thereby creating a passivated pigment dispersion can be conducted. According to a more specific embodiment, the passivation layer may contain at least one urethane linkage or urea linkage, or a polyurethane. In another embodiment, the passivated pigment may further include a polymer-encapsulation layer attached or deposited onto the passivation layer.

In another embodiment, a pigment suspension can comprise an aqueous liquid vehicle; and a passivated pigment suspended in the liquid vehicle. The passivated pigment can include a pigment core, and a passivation layer containing a polyurethane deposited on the surface of the pigment core.

In another embodiment, an ink set, comprising multiple pigment suspensions where at least two (or more or all) inks are formulated in accordance with the embodiments described herein. For example, an ink set can comprise a first ink-jet ink and a second ink-jet ink (and optionally, third, fourth, fifth, sixth, etc., ink-jet inks). The first ink-jet ink can comprise a first aqueous liquid vehicle and a first polymer-encapsulated pigment colorant suspended in the first liquid vehicle. The first polymer-encapsulated pigment colorant can include a first pigment core, a first passivation layer deposited on a surface of the pigment core, and a first polymer-encapsulation layer attached or deposited on the first passivation layer. The second ink-jet ink can comprise a second aqueous liquid vehicle and a second polymer-encapsulated pigment colorant suspended in the second liquid vehicle. The second polymer-encapsulated pigment colorant can include a second pigment core, a second passivation layer deposited on a surface of the second pigment core, and a second polymer-encapsulation layer attached or deposited on the passivation layer. In this embodiment, the first pigment core and the second pigment core can be different pigment colorants, the first passivation layer and the second passivation layer can be formed of the same material, and the first polymer-encapsulation layer and the second polymer-encapsulation layer can be formed of the same material. This being stated by example, it is noted that the respective pigment cores, passivation layers, and/or polymer-encapsuation layers can be the same or different. The first and second liquid vehicle can also be the same or different.

The formation of pigment suspensions in accordance with the above embodiments provides several advantages. For example, polymer-encapsulation of pigments tends to reduce the number of total particles in solution (as opposed to having separate latex particulates co-dispersed with the pigments) and their combined surface areas such that the pigment suspension, e.g., ink, viscosity can be reduced. Such polymer-encapsulation also provides a particle dispersion where the particle surfaces are more uniformly charged, and are therefore more stable. Encapsulation also prevents pigment-latex separation when applied to a substrate, e.g., ink printed on a media substrate, such that durability and optical density are more optimized. Polymer-encapsulated pigments also facilitate the result that each pigment particle becomes trapped below the surface of latex formed films (after printing) such that gloss and color-to-color gloss uniformity is enhanced. Additionally, when preparing an ink set, by applying an optional bridging layer to the surface of each of the different pigments in the ink set, common polymer encapsulation layers can be applied to the surface of each of the different types of pigments without difficulty, which provides significant advantages in print quality, thermal ink-jet reliability, etc. It is common, for example, that the relative surface tension and polarity of the pigment surface and absorbing monomer can influence the integrity of encapsulation. A common bridging layer for each different colored pigment can be selected to optimize or improve the particle surface tension and polarity for a given capsule polymer. Further, uniquely in accordance with embodiments of the present invention, relatively thick coatings of monomers and polymer admixtures can be effectively applied, which can be polymerized to form the polymeric shell.

In further detail, in-situ monomer polymerization around individual pigment particles is desirable but is made difficult by the fact that many pigments contain free radical quenching surface groups such as amino, phenol, hydroxyl, carbonyl, and imino groups. Such quenching disrupts polymer formation and adsorption on the pigment surface and results in residual unreacted monomer in the finished product. This difficulty can be addressed by "passivating" the pigment, i.e.

modifying the surface of the pigment with a passivation layer or bridging layer. In the present invention, pigment particles coated with such a layer may then be directly incorporated into an ink-jet ink usable in a number applications. Alternatively, the passivation layer may be used to facilitate more efficient deposition of an additional polymer coating on the particle surface.

While passivation can be useful in addressing the difficulties inherent in encapsulating many pigments, its effectiveness in turn depends on how well a passivation layer coats the surface of pigment particles. When coating is ineffective or incomplete, areas of the pigment particle surface may still present functional groups that will interfere with encapsulation. It is therefore important that coating of particles by a passivation layer be as complete and uniform as possible. However, application of a polymer-based passivation layer is also subject to the difficulty presented by free radical quenching surface groups. The present invention provides methods for applying a passivation layer to pigment particles with improved efficiency. The passivation resulting from these methods results in pigments having a coating that makes them suitable for incorporating into ink-jet inks having improved durability properties. In addition, the uniformity of the passivation coating makes possible more efficient encapsulation with latex polymers.

According to the present invention, more efficient passivation of pigment particles with a polymer may be achieved by commencing the polymerization of constituent monomers in an environment separate from the pigment. As such, this approach results in polymer precursors that are synthesized without interference from the surface groups often found on pigment particles. Furthermore, these precursors may be formed in a solvent that is compatible with the eventual desired ink-jet ink, thereby reducing the need for additional quantities of solvent later in the ink formulation process. Accordingly, for a given polymer desired to make up the passivation layer, polymer precursors are created by joining at least two constituent monomers in a solvent-based polymerization process without pigments being present. Once made, the precursors are then added to a dispersion of the pigment so as to achieve coating of the particles.

In one embodiment, the passivation layer comprises a polyurethane. Therefore, any combination of constituent monomers that can react to form polyurethanes is contemplated by this method. In a particular aspect, at least two constituent monomers are used, the first monomer being a molecule having at least two isocyanate moieties, such as a diisocyanate. Some examples of diisocyanates that may be used include isophorone diisocyanate, tolylene-2-4-diisocyanate, hexamethylene diisocyanate, napthalene diisocyanate, 2,4-toluene diisocyanate, 2,6-toluene diisocyanate, methylene diphenyl-4,4'-diisocyanate, 1,4-tetramethylene diisocyanate, and biphenyl diisocyanate. In the same aspect, the second monomer may be a polyol, e.g. a diol. Potential constituent diols include $C_2$-$C_8$ diols as well as polyglycols, including ethylene glycol, propylene glycol, polyethylene glycols, polypropylene glycols, bisphenol-A, hydroquinone, and polybutylene glycols. This reaction can for urethane linkage groups or polyurethane. In an alternative embodiment, the passivation layer comprises urea linkage groups or polyurea. Therefore, any combination of constituent monomers that react to form polyureas is contemplated by this method. In a particular aspect, as in the polyurethane embodiment, the first monomer can be an isocyanate such as a diisocyanate. In the same aspect, the second monomer may be a polyamine (e.g. a diamine), which generates urea linkage groups. Alternatively, when the second monomer is an amino alcohol, such as ethanolamine, propanolamine, or aminophenol, the passivation layer can include a mixture of urethane and urea groups.

Under either of these aspects, known isocyanate polymer chemistry techniques may be utilized. An isocyanate and a second monomer may be dissolved or suspended in a solvent. Then polymerization is allowed to proceed to yield polymer precursors within a desired molecular weight range. The molecular weight of the resulting precursors can be controlled by choosing the appropriate ratio of isocyanate to diol or diamine. For example, to yield a higher molecular weight product, the ratio of isocyanate to second monomer should approach 1:1. Conversely, utilizing more diol or diamine will result in polymer precursors having lower molecular weight. The resulting suspension of precursor is suitable for passivating pigment particles. Since polymerization of the precursor is initiated without pigment present, therefore allowing more control over the stoichiometry of the process, it is easier to design and synthesize a polymer precursor having the desired characteristics for coating the intended pigment.

Preferably, the solvent in which the precursor is made is compatible with the eventual ink-jet ink desired and, more specifically, with at least one phase of the liquid medium in which the pigment to be coated is dispersed. For example, it is common to disperse pigment in an aqueous medium, or a medium having an aqueous phase. Accordingly, the solvent used in forming the polymer precursor should be water-miscible so as to be able to enter the aqueous phase of the dispersion when added to it.

To coat the pigment particles, a dispersion of the pigment is prepared by conventional methods. According to one embodiment, the pigment is dispersed in an aqueous medium. The pigment can be deaggregated and dispersed in water using standard shear processes, such as microfluidization, sonification, or milling, in the presence of surfactant, dispersing polymer or other dispersing moiety. The water miscible solvent diffuses into the aqueous phase of the pigment dispersion, resulting in phase separation of the hydrophobic precursor, which can be drawn to adsorb onto the pigment surface. Careful selection of pigment dispersant, ratios of pigment to polymer precursor, etc., can minimize the formation of pure precursor particles, as it is more desirable that the passivation component be primarily attracted to the surface of the pigment particle. During this process, the precursor polymer coats the surface of each pigment particle, forming a substantially complete and uniform passivation layer on each particle. Once the coating is accomplished, the isocyanate end groups of the passivation layer can be further polymerized with water or with additional di- or polyamines to further solidify the coating by increasing the molecular weight of the precursor.

These passivated pigment particles can be used without further modification. Alternatively, the particles may be further encapsulated by conventional processes of emulsion polymerization. Referring now in more detail to the polymer-encapsulation layer per se, in one embodiment, a latex polymer material can be used. The latex of the present invention is preferably prepared through conventional free radical addition of a monomer mixture through emulsion polymerization. Solvent and any excess surfactant can be removed from the dispersion by dialysis so as not to interfere with the emulsion process. Suitable monomers include styrene, p-methyl styrene, methyl methacrylate, hexyl acrylate, hexyl methacrylate, butyl acrylate, butyl methacrylate, ethyl acrylate, hydroxyethyl acrylate, ethyl methacrylate, hydroxyethyl methacrylate, propyl acrylate, hydroxypropyl acrylate, propyl methacrylate, hydroxypropyl methacrylate, vinylbenzyl chloride, and mixtures thereof. Additionally, other suitable monomers are included in U.S. Pat. No. 6,057,384, which is incorporated herein by reference in its entirety. The latex can be a dispersion stabilized through incorporation of a monomer or monomers that promote latex surface charge. Such monomers are represented by acrylic acid, methacrylic acid, vinyl benzoic acid, maleic acid, itaconic acid, and methacryloyloxyethylsuccinate. The charge forming monomers typically comprise from 0.5 wt % to 20 wt %, preferably 3 wt % to 10 wt %, of the monomer mix by weight and are typically neutralized after latex polymerization to form salts. Such salts may be formed through the reaction of a monomer carboxylic acid with potassium hydroxide or other similar salting agent.

Particle dispersion stability is also influenced by particle density, which influences the ability of particles to settle within ink-jet architecture microchannels. In the present invention, the monomer mixture, pigment, passivation precursor, and monomer/polymer-pigment ratio can be selected to collectively produce particles having a density that is often greater than 1.0 g/cm$^3$. Stability of higher density particles can be achieved by reducing the size and increasing the surface charge of the particles.

Steric stabilizers, such as surfactants, are generally also used to control the latex particle size during polymerization and can also be selected to provide additional pigment particle dispersion stability. Such stabilizers are often adhered to the encapsulated particle surface to minimize thermal stripping under thermal architecture firing conditions. This can be accomplished by matching the hydrophobicity of the latex monomer set and surfactant, and/or through incorporation of a reactive surfactant.

Additionally, the surface dielectric constant of the polymer-encapsulated pigments of the present invention can be from 2.0 to 3.0, and can be below 2.8 in one embodiment. This property can be useful to sufficiently anchor surfactants against thermal shear stripping in thermal ink-jet architecture. Stabilization can also be facilitated by the incorporation of 0.5 wt % to 15 wt %, or from 0.5 wt % to 5 wt %, and often from 1 wt % to 2 wt %, of addition of a multimer, preferably a dimer, capable of forming crosslinks between polymer chains in the latex particle. Such a multimer is represented by ethylene glycol dimethacrylate, for example. These narrow ranges of crosslinking have been found beneficial to maintain the integrity of the latex under the high thermal shear conditions of thermal ink jetting while not adversely impacting its room temperature film-forming properties. Such crosslinking is helpful for latexes having glass transition temperatures below 50° C. Room temperature film-forming latexes require glass transition temperatures in the range of 0° C. to 50° C., preferably 10° C. to 40° C. Higher glass transition temperature ranges may be selected when latex coagulation is accomplished at a higher than ambient temperature, for example by heated fuser roller. The latex may optionally contain color stabilizers that associatively protect the pigment colorant against photo, thermal and gaseous degradation.

The thickness of the polymer or latex capsule can be any suitable thickness, but is typically greater than 50 nm to allow adequate film formation to occur on a media substrate upon printing. Typically, the selected pigment core can be sized below 150 nm, but is preferably below 100 nm in diameter, and the latex encapsulated particle diameter can be from about 200 to 300 nm, though diameters outside of this range may be appropriate as well for certain applications. Additionally, the passivation layer can have a thickness of about 5 nm to about 20 nm.

In an alternate embodiment, a conventional core-shell latex structure may also be used, where the shell layer incorporates a monomer mix defined by the above surface charge monomer, multimer and dielectric constant specifications. The shell layer, in this case, provides thermal shear and dispersion stabilizing properties independent of the properties of the latex core. The core and shell polymers can collectively provide a latex particle having a bulk density and glass transition temperature as defined above for the monolithic latex. Core-shell latexes are prepared in a two step process; where in a first latex particle is synthesized and forms a seed for polymerization of the shell monomers around the seed particle in the second step. These types of core-shell latexes can be attached to the passivation layer adsorbed on the pigment particle. Alternatively, the core can refer to the pigment encapsulated by the passivation layer, and the shell can refer to the polymer-encapsulating material. In this embodiment, the core can be present in a range from about 15 wt % to about 25 wt % with a polymer shell in a range of from about 75 wt % to about 85 wt %. Still further, rather than a three-layered pigment structure, a four-layered pigment structure can be prepared that includes the pigment core, the passivation layer, the core (of the core-shell latex) attached to the passivation layer, and the shell (of the core-shell latex) attached to the core.

With these parameters in place regarding some of the possible passivation layer-containing polymer-encapsulated pigments that can be formed, a discussion of dispersion fluids, e.g., inks, etc., is useful to exemplify how these pigments can be implemented for use in accordance with an embodiment of the present invention. As mentioned, the passivated pigment particles can be used without being encapsulated or otherwise modified further. That is, a pigment suspension can comprise an aqueous liquid vehicle in which are suspended pigment particles passivated according to the methods described above. In a more specific embodiment, where the pigment is a pigment colorant, the pigment suspension is an ink-jet ink. Alternatively, the pigment suspension or ink-jet ink can comprise polymer-encapsulated pigment particles made according to the methods of the present invention. Because the present invention provides for more complete and uniform coating of pigment particles, either with a passivation coating alone or together with a latex, these particles exhibit greater dispersion stability in suspension. Furthermore, inks containing these particles more fully provide the improved durability properties associated with polymer-encapsulated pigments.

Typically, inks include a pigment dispersed in a liquid vehicle. Typical liquid vehicle formulation that can be used with the latexes described herein can include water, and optionally, one or more co-solvents present in total at from 0 wt % to 30 wt %, depending on the jetting architecture. Further, one or more non-ionic, cationic, and/or anionic surfactant can be present, ranging from 0 wt % to 5.0 wt %. The balance of the formulation can be purified water, or other vehicle components known in the art, such as biocides, viscosity modifiers, materials for pH adjustment, sequestering agents, preservatives, and the like. Typically, the liquid vehicle is predominantly water.

Classes of co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this invention may range from 0 wt % to 5.0 wt %. It is to be noted that the surfactant that is described as being usable in the liquid vehicle is not the same as the surfactant that is described as being adhered to the surface of the latex particulate, though many of the same surfactants can be used for either purpose.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT™ (Nudex, Inc.), UCARCIDE™ (Union carbide Corp.), VANCIDE™ (R.T. Vanderbilt Co.), PROXEL™ (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2.0 wt %, for example, can be used. Viscosity modifiers and buffers may also be present, as well as other additives known to those skilled in the art to modify properties of the ink as desired. Such additives can be present at from 0 wt % to 20.0 wt %.

In accordance with embodiments of the present invention, the polymer-encapsulated pigments of the present invention can be present in a pigment dispersion at from 1 wt % to 30 wt %. If the pigment dispersion is an ink-jet ink, the polymer-encapsulated pigments of the present invention can be present in a ink-jet ink at from 1 wt % to 10 wt %.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

Synthesis of a Polyurethane Precursor for Use in Pigment Passivation

In a round-bottom flask, 2.92 g of 1,8-octanediol is dissolved in 10 g of N-methylpyrrolidone, along with 0.6 g of bis(hydroxymethyl)butyric acid. Then a small drop of dibutyltindilaurate is added, followed by 7.1 g of isophoronediisocyanate. This mixture is heated to 85° C. for 3 hours, and then is allowed to cool to yield a suspension of polyurethane precursor.

Example 2

Formation of a Polyurethane Passivation Layer on Carbon Black Pigment

Printex 25™ carbon black pigment (150 g, Degussa Co.) is mixed with 15 g of Lutensol AT 50™ in 1635 ml of water. This mixture is stirred well and sonicated at 90% amplitude for 45 minutes using an ultrasonicator (Model 450, Branson Ultrasonics, Co.) This dispersion is then further subjected to at least 3 passes in a microfluidizer at 90 psi to obtain a stable pigment dispersion with 8.3% solid content. The pigment dispersion (60 g) is stirred well. The polyurethane precursor from Example 1 is added dropwise to the dispersion. After about 5 minutes, 0.19 g ethylenediamine is added to increase the molecular weight of the polymer. Stirring is continued for 24 hours to obtain uniformly passivated carbon black particles.

Example 3

Encapsulation of Passivated Carbon Black Pigment

The above urethane coated pigment solution from Example 2 (30 g) is heated to 85° C. under nitrogen. The initiator potassium persulfate (0.075 g) is added followed by the emulsion over a period of 5 min. The emulsion is prepared by mixing styrene, hexyl methacrylate, 3-vinylbenzoid acid and ethylene glycol dimethacrylate in the weight ratio of 20/73/6/1 (2 g) in water (2.5 ml) containing the non-ionic surfactant Lutensol AT 50 (0.05 g). The reaction mixture is heated at 85° C. for 3 h and cooled to obtain polymer-encapsulated carbon black particles.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. A method of making a passivated pigment dispersion, comprising the steps:
   a) dispersing pigment particles in an aqueous liquid vehicle to form a pigment dispersion;
   b) introducing a first monomer and a second monomer into a water-miscible solvent in which the first monomer and the second monomer polymerize to form a passivation coating solution containing a polymer precursor including at least one urethane linkage or urea linkage, wherein polymerization is initiated separately from the pigment dispersion;
   c) forming a passivation layer on the surface of the pigment particles by adding the passivation coating solution to the pigment dispersion so that the polymer precursor substantially uniformly coats the pigment particles, thereby creating a passivated pigment dispersion; and
   d) polymerizing at least one encapsulation monomer in the passivated pigment dispersion, said at least one monomer forming a polymer-encapsulation layer deposited on or attached to the passivation layer, thereby forming a polymer-encapsulation pigment, wherein the at least one encapsulation monomer is selected from the group consisting of styrene, p-methyl styrene, methyl methacrylate, hexyl acrylate, hexyl methacrylate, butyl acrylate, butyl methacrylate, ethyl acrylate, hydroxyethyl acrylate, ethyl methacrylate, hydroxyethyl methacrylate, propyl acrylate, hydroxypropyl acrylate, propyl methacrylate, hydroxypropyl methacrylate, vinylbenzyl chloride, and combinations thereof.

2. The method of claim 1, wherein the polymer precursor includes the urethane linkage and not the urea linkage.

3. The method of claim 1, wherein the polymer precursor includes the urea linkage and not the urethane linkage.

4. The method of claim 1, wherein the polymer precursor includes the urethane linkage and the urea linkage.

5. The method of claim 1, wherein the first monomer is an isocyanate.

6. The method of claim 5, wherein the second monomer is a polyol, resulting in the urethane linkage.

7. The method of claim 5, wherein the second monomer is a polyamine, resulting in the urea linkage.

8. The method of claim 5, wherein the second monomer is an amino alcohol, resulting in a mixture of the urethane linkage and the urea linkage.

9. The method of claim 8, wherein the amino alcohol is ethanolamine, propanolamine, aminophenol, or mixtures thereof.

10. The method of claim 9, further comprising the step of crosslinking the polymer-encapsulation layer with a crosslinking agent, where the crosslinking agent is present in the polymer-encapsulation layer in an amount of from 0.5 wt % to 15 wt %.

11. A pigment suspension, comprising:
a) an aqueous liquid vehicle; and
b) a passivated pigment suspended in the liquid vehicle, said passivated pigment including:
i) a pigment core,
ii) a passivation layer containing a polyurethane or polyurea deposited on the surface of the pigment core, wherein the polyurethane or polyurea substantially covers the surface of the pigment core and is distributed uniformly over said surface; and
iii) a polymer-encapsulation layer attached to or deposited on the passivation layer, wherein the polymerization encapsulation layer is polymerized from at least one monomer selected from the group consisting of styrene, p-methyl styrene, methyl methacrylate, hexyl acrylate, hexyl methacrylate, butyl acrylate, butyl methacrylate, ethyl acrylate, hydroxyethyl acrylate, ethyl methacrylate, hydroxyethyl methacrylate, propyl acrylate, hydroxypropyl acrylate, propyl methacrylate, hydroxypropyl methacrylate, vinylbenzyl chloride, and combinations thereof.

12. The pigment suspension of claim 11, where the polymer-encapsulation layer is crosslinked with a crosslinking agent present at from 0.5 wt % to 15 wt %.

13. The pigment suspension of claim 11, wherein the pigment core is a pigment colorant, and the pigment suspension is an ink-jet ink.

14. The pigment suspension of claim 11, wherein the passivation layer is prepared by reacting an isocyanate with a polyol, a polyamine, or an amino alcohol.

15. The pigment suspension of claim 11, wherein the aqueous liquid vehicle comprises a co-solvent selected from the group comprising: aliphatie alcohols, aromatic alcohols, diols, glycol ethers, polyglycol ethers, eaprolactams, formamides, acetamides, and mixtures thereof 16. An ink set, comprising multiple pigment suspensions, at least two of which being formulated in accordance with claim 14.

* * * * *

UNITED STATES PATENT AND TRADEMARK OFFICE
CERTIFICATE OF CORRECTION

PATENT NO. : 7,737,196 B2  Page 1 of 1
APPLICATION NO. : 11/789172
DATED : June 15, 2010
INVENTOR(S) : Sivapackia Ganapathiappan It is certified that error appears in the above-identified patent and that said Letters Patent is hereby corrected as shown below:

In column 12, line 28, in Claim 15, delete "aliphatie" and insert -- aliphatic --, therefor.

In column 12, line 29, in Claim 15, delete "eaprolactams," and insert -- caprolactams, --, therefor.

In column 12, line 30, in Claim 15, after "thereof" insert -- . --.

Signed and Sealed this

Twenty-sixth Day of October, 2010

David J. Kappos
*Director of the United States Patent and Trademark Office*